Aug. 20, 1957   J. E. PHELAN ET AL   2,803,223
POWER TRANSMISSION
Filed Aug. 3, 1955

INVENTORS
JAMES E. PHELAN
MATT MARICH
ERNEST J. LARSON
BY
Ralph L. Tweedale
ATTORNEY United States Patent Office 2,803,223
Patented Aug. 20, 1957

2,803,223

POWER TRANSMISSION

James E. Phelan, Matt Marich, and Ernest J. Larson, Globe, Ariz., assignors to Vickers Incorporated, Detroit, Mich., a corporation of Michigan Application August 3, 1955, Serial No. 526,188

4 Claims. (Cl. 121—41)

This invention relates to power transmissions, and is particularly applicable to those of the type comprising two or more fluid pressure energy translating devices, one of which may function as a pump and another as a fluid motor.

The invention more particularly relates to power transmissions adapted for use in servo applications such as power steering the dirigible wheels of a vehicle.

Most designers of power steering systems for use in motor vehicles have endeavored to retain as nearly as possible the same handling characteristics as in the conventional manual system. This requires a system having a neutral point wherein it exerts no steering force when the vehicle operator is exerting no force on the steering wheel. When the operator turns the steering wheel, the booster control valve is shifted from this neutral position and actuates the booster motor to assist in steering.

The type of control valve which has found the widest use in such systems has been the linear movement type having a neutral central position and being shiftable therefrom in opposite directions to effect opposite movements of a fluid motor connected to the vehicle dirigible wheels. Such valves are usually provided with spring centering means to restore the valves to neutral position on removal of the shifting force. It is important in such valves that the centering means act to restore the valve to precisely the effective neutral position, otherwise improper steering will result. If the centered position of the valve is not made adjustable, machining tolerances must be very closely controlled, thus making the valve expensive to manufacture. Further, during severe service conditions and after long use the original centered position may no longer be hydraulically neutral. Provisions made in the past for centering adjustments have been complex and difficult to manipulate, often requiring a number of operations.

Further, where the integral type of booster—that is, the type having the fluid motor and valve in an integral assembly—was suspended between an anchor point at one end and an output member at the other end, it was necessary in the past to dismount the booster from the steering linkage assembly before adjustment of the pilot valve could be accomplished. Initial adjustment at the factory before installation was a simple matter. However, when the valve needed adjustment after being put in service, it was a time consuming task, since in many installations the booster is welded into the steering linkage.

It is an object of the present invention to provide an improved, low-cost, integral type steering booster. It is a further object to provide in a booster of the integral type wherein the motor and valve are disposed between the anchor and output connections, a single simple adjustment for the spring centered position of the control valve which can be accomplished from a point external of the booster and without dismounting the booster from the vehicle steering linkage.

Further objects and advantages of the present invention will be apparent from the following description, reference being had to the accompanying drawing wherein a preferred form of the present invention is clearly shown.

Figure 1:
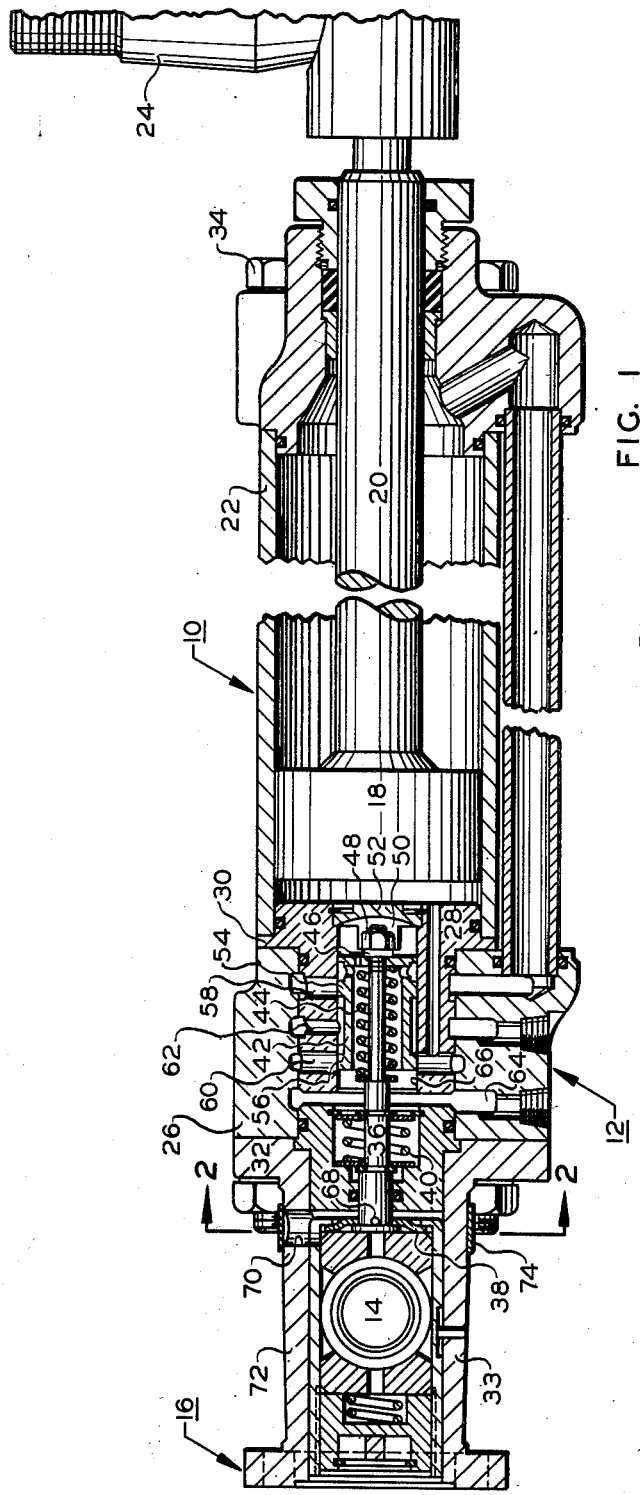
Figure 1 is a longitudinal section taken through a steering booster incorporating the present invention.
Figure 2:
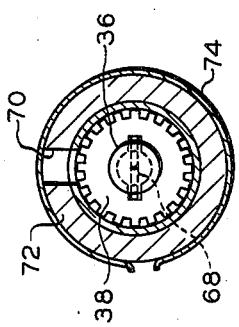
Figure 2 is a section taken on line 2—2 of Figure 1.

Referring first to Figure 1, the steering booster there illustrated is of the general type shown in the U. S. patent to Harry F. Vickers, No. 2,022,698 and includes a fluid motor section generally designated 10, a valve section generally designated 12, an input member 14, and an output connection member 16. The motor 10 and valve 12 are coaxially disposed along a line between an anchor connection member 24 and the output connection member 16.

The motor section 10 includes a piston 18 having a rod 20 which extends from the cylinder 22, and carries the anchor connection member 24 thereon. The valve section 12 includes a body 26 having a sleeve 28 therein. A flange 30 of sleeve 28 is secured between abutting surfaces of the cylinder 22 and the valve body 26. Cylinder 22, valve body 26, and a flange 32 on end member 33 are held together in a sandwich relation by bolts 34 which extend the length of cylinder 22.

When installed in a motor vehicle the anchor connection 24 is normally secured to the frame of the vehicle and the output connection member 16 is connected to the tie rod. The input member 14 is connected to the pitman arm of the steering mechanism.

A valve shaft 36 is shiftable with the input member 14 and is secured thereto by an indented washer 38 which is sandwiched between cooperating abutments on the input member. The valve shaft 36 is resiliently biased to a fixed position relative to the valve body by a biasing spring and centering mechanism 40. It will be seen that whenever the valve shaft 36 and input member 14 are shifted from the illustrated position, a return force will be exerted thereon by the centering mechanism 40.

The valve shaft 36 has supported thereon a valve spool 42. Spool 42 is biased by a spring 44 against the shoulder of a washer 46, which in turn abuts a self locking nut 48, threaded on the valve shaft 36. Nut 48 is restrained against rotation relative to the valve body 26 and sleeve 28 by the flat parallel walls of a slot 50 which is milled in the valve bore plug 52. With the nut 48 restrained against rotation, rotation of valve shaft 36 will cause axial shifting of nut 48 and washer 46 on the valve shaft 36.

The valve spool 42 has a pair of valving lands 54 and 56 thereon. Valving lands 54 and 56 control a pair of motor ports 58 and 60, respectively, in the sleeve 28. Ports 58 and 60 lead to opposite ends of motor 10, a pressure port 62 leads to the cannelure included between lands 54 and 56, and a return port 64 communicates with the end of the valve bore 66.

In the centered position of spool 42, as illustrated, an open center condition exists. Pressure port 62 is in fluid communication with the return port 64 across lands 54 and 56. It is also apparent that motor ports 58 and 60 both are connected to return port 64, when spool 42 is in the center position shown. Movement of the valve spool 42 in either direction will produce a pressure increase in one of the motor ports 58 or 60, in a manner well known in the art, thus producing hydraulic steering force at the motor 10.

In order that the steering booster function properly, it is necessary that the centering means 40 return the valve spool 42 to a neutral position such that no steering force is exerted by the motor 10. Due to the differential area of piston 18 and the machining tolerances involved in the manufacture of the valve components, it is very difficult to predict the exact spool location which will be hydraulically neutral, that is, which will produce no steering force in the motor 10. It is highly desirable that the centered position of the control valve be adjustable after the booster is installed in a vehicle and also that it be easily adjustable after a period of service. As was heretofore noted, it has been the practice in the past to remove the booster from the vehicle, make adjustments on a test stand, and reinstall the booster. The present invention has provided a simple, fool-proof, and low-cost arrangement for adjusting the control valve centered position from outside the booster and without the necessity of removing the booster from the steering linkage.

A pin 68 extends through the valve shaft 36 and keys it to the washer 38. Washer 38 has a plurality of serrations or teeth around the periphery thereof. An access hole 70 extends laterally through the booster side wall 72, and is covered by a removable spring clip 74. To adjust the spring centered position of spool 42, it is only necessary to shift, or remove, the clip 74 to uncover the access hole 70, insert a screw driver or a like implement in the hole to engage the serrations on washer 38, and rotate the valve shaft 36. As was heretofore noted, rotation of valve shaft 36 causes axial shifting of nut 48 and washer 46 on the valve shaft. Since spool 42 is continually biased against the washer 46 by spring 44, the spring biased center position of spool 42, as established by the centering mechanism 40, is easily and quickly adjustable from the exterior of the booster and without disturbing the anchor and output connections.

There has thus been provided a low cost, steering booster of the integral type, in which the spring centered position of the valve spool is easily and quickly adjustable, even while the booster is still coupled into the steering linkage.

While the form of embodiment of the invention herein disclosed constitutes a preferred form, it is to be understood that other forms might be adopted, all coming within the scope of the claims which follow.

What is claimed is as follows:

1. In a servo mechanism of the linear movement type having anchor and output connections at opposed ends thereof, a fluid motor and a control valve axially disposed substantially along a line between said connections, the valve including a body and spool, said body being secured to the motor and said spool being actuable to control the motor, and resilient means biasing the spool to a fixed position relative to the valve body, that improvement comprising: means for adjusting said fixed position without disturbing the anchor and output connections, said means including means forming an access hole extending laterally into said mechanism between said connections, and an adjustment member actuable through said access hole.

2. In a servo mechanism of the linear movement type having anchor and output connections at opposed ends thereof, a fluid motor and a control valve axially disposed substantially along a line between said connection, the valve including a body and spool, said body being secured to the motor and said spool being actuable to control the motor, and resilient means biasing the spool to a fixed position relative to the valve body, that improvement comprising: means for adjusting said fixed position without disturbing the anchor and output connections, said means including means forming an access hole extending laterally into said mechanism between said connections, and a toothed adjustment member actuable through said access hole.

3. In a servo mechanism of the linear movement type having anchor and output connections at opposed ends thereof, a fluid motor and a control valve axially disposed substantially along a line between said connections, the valve including a body and spool, said body being secured to the motor and said spool being carried by a valve shaft actuable to control the motor, resilient means biasing the valve shaft to a fixed position relative to the valve body, and an adjustable abutment on the shaft, against which the spool is biased, that improvement comprising: means for adjusting the location of the abutment on the shaft without disturbing the anchor and output connection, said means including means forming an access hole extending laterally into said mechanism between said connections, and a rotatable member actuable through said access hole for shifting the abutment on the shaft.

4. In a servo mechanism of the linear movement type having anchor and output connections at opposed ends thereof, a fluid motor and a control valve axially disposed substantially along a line between said connections, the valve including a body and spool, said body being secured to the motor and said spool being carried by a valve shaft actuable to control the motor, resilient means biasing the valve shaft to a fixed position relative to the valve body, and an adjustable abutment threaded on the shaft, against which the spool is biased, that improvement comprising: means for adjusting the location of the abutment on the shaft without disturbing the anchor and output connections, said means including means forming an access hole extending laterally into said mechanism between said connections, and a toothed, rotatable member actuable through said access hole for rotating the valve shaft relative to the abutment for shifting the abutment on the shaft.

References Cited in the file of this patent

UNITED STATES PATENTS

| | | |
|---|---|---|
| 2,022,698 | Vickers | Dec. 3, 1935 |
| 2,456,211 | Nardone | Dec. 14, 1948 |
| 2,660,255 | Schindler | Nov. 24, 1953 |